(12) United States Patent
Yates et al.

(10) Patent No.: US 11,365,027 B2
(45) Date of Patent: Jun. 21, 2022

(54) CONTAINER WITH APERTURED SHRINK SLEEVE AND RELATED PROCESSES

(71) Applicant: The Procter & Gamble Company, Cincinnati, OH (US)

(72) Inventors: Claire Rebecca Yates, Cincinnati, OH (US); Richard Timothy Hartshorn, Lawrenceburg, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 139 days.

(21) Appl. No.: 16/655,267

(22) Filed: Oct. 17, 2019

(65) Prior Publication Data
US 2020/0130895 A1 Apr. 30, 2020

Related U.S. Application Data

(60) Provisional application No. 62/753,326, filed on Oct. 31, 2018.

(51) Int. Cl.
*B65D 23/08* (2006.01)
*B65D 23/10* (2006.01)
(Continued)

(52) U.S. Cl.
CPC ........ *B65D 25/2802* (2013.01); *B29C 63/423* (2013.01); *B65D 1/02* (2013.01);
(Continued)

(58) Field of Classification Search
CPC ................ B65D 25/2802; B65D 25/54; B65D 2525/281; B65D 2203/00; B65D 2203/02;
(Continued)

(56) References Cited

U.S. PATENT DOCUMENTS 3,443,710 A * 5/1969 Hills .................... B65D 1/0223
215/385
5,922,158 A * 7/1999 Culp .................... F17C 13/003
156/86

(Continued)

FOREIGN PATENT DOCUMENTS

JP H09240677 A 9/1997
JP 2013013657 A 1/2013
(Continued)

OTHER PUBLICATIONS

International Search Report; International Application No. PCT/US2019/056035; dated Feb. 10, 2020; 14 pages.
(Continued)

*Primary Examiner* — Gideon R Weinerth
(74) *Attorney, Agent, or Firm* — Gary J. Foose

(57) ABSTRACT

A container at least partially surrounded by a shrink sleeve, the shrink sleeve including a shrink sleeve aperture being defined by an aperture peripheral boundary having a peripheral length, where the shrink sleeve and the container are substantially the same color along at least a portion of the peripheral length. Processes for making such containers. Containers where the shrink sleeve and the container are substantially different colors along the peripheral length.

18 Claims, 9 Drawing Sheets

(51) Int. Cl.
  *B65D 71/08* (2006.01)
  *B65D 25/28* (2006.01)
  *B29C 63/42* (2006.01)
  *B65D 1/02* (2006.01)
  *B65D 1/40* (2006.01)
  *B65D 25/54* (2006.01)
  *B29L 31/46* (2006.01)

(52) U.S. Cl.
  CPC ............... *B65D 1/40* (2013.01); *B65D 25/54* (2013.01); *B29L 2031/463* (2013.01); *B65D 23/0878* (2013.01); *B65D 23/10* (2013.01); *B65D 2203/00* (2013.01); *B65D 2525/281* (2013.01)

(58) Field of Classification Search
  CPC .. B65D 23/0878; B65D 23/10; B29C 63/423; B29C 49/24; B29C 63/42; B29L 2031/7158; B29L 2031/744; B29L 2031/463; B29L 2031/712; B29L 2031/722; G09F 2003/0272; G09F 2003/0273; G09F 2003/0251; G09F 2003/0208; G09F 3/04; Y10T 428/1328
  USPC ...... 206/484, 497; 53/415, 135.1–136.5, 441, 53/556
  See application file for complete search history.

(56) References Cited

U.S. PATENT DOCUMENTS

| | | | | |
|---|---|---|---|---|
| 7,918,342 B2* | 4/2011 | Fresnel | ................. | B65D 25/56 206/772 |
| 8,403,582 B2 | 3/2013 | Bischoff | | |
| 9,371,158 B2* | 6/2016 | Larson | ................. | B65D 85/70 |
| 9,580,195 B2 | 2/2017 | Goudy | | |
| 9,707,683 B2 | 7/2017 | Goudy | | |
| 9,751,258 B2 | 9/2017 | Goudy | | |
| 2002/0124931 A1* | 9/2002 | Etesse | ................. | B65D 23/10 156/86 |
| 2002/0153345 A1* | 10/2002 | Johnson | ................. | B65D 23/10 215/398 |
| 2004/0129369 A1* | 7/2004 | Johnson | ................. | B29C 63/423 156/85 |
| 2005/0139568 A1* | 6/2005 | Falk | ................. | B65D 23/10 215/12.2 |
| 2006/0008602 A1* | 1/2006 | Mills | ................. | C09J 7/22 428/34.4 |
| 2007/0090010 A1* | 4/2007 | Crabtree | ................. | B65D 23/00 206/459.1 |
| 2007/0095721 A1* | 5/2007 | Davis | ................. | B65D 23/0878 206/581 |
| 2011/0042255 A1* | 2/2011 | Traboulsi | ................. | B65D 25/56 206/459.5 |
| 2014/0290827 A1 | 10/2014 | Heeman | | |
| 2015/0248849 A1* | 9/2015 | Lorence | ................. | B65D 25/205 206/459.5 |
| 2015/0291315 A1* | 10/2015 | McConnell | ................. | B65D 23/14 206/81 |
| 2016/0114926 A1* | 4/2016 | Gou | ................. | B65B 61/16 225/2 |
| 2020/0130895 A1* | 4/2020 | Yates | ................. | B65D 1/02 |
| 2020/0198829 A1* | 6/2020 | Rizzo | ................. | B29B 11/14 |
| 2020/0198831 A1* | 6/2020 | Rizzo | ................. | B29C 49/22 |

FOREIGN PATENT DOCUMENTS

| | | |
|---|---|---|
| JP | 2016071116 A | 5/2016 |
| WO | WO9417982 A1 | 8/1994 |

OTHER PUBLICATIONS

Photo of a bottle with shrink sleeve; a Procter & Gamble product; commercially available in Japan in Nov. 2017.

* cited by examiner

CONTAINER WITH APERTURED SHRINK SLEEVE AND RELATED PROCESSES

FIELD OF THE INVENTION

The present disclosure relates to containers with apertured shrink sleeves. The present disclosure further relates to processes for making such containers.

BACKGROUND OF THE INVENTION

It is known to at least partially surround a container with a shrink sleeve. A portion of the shrink sleeve may be removed to expose a surface of the container; the removed portion leaves behind an aperture. Such apertures may be desirable, for example, to expose a portion of a handle and/or a gripping surface on the container.

However, there are challenges associated with manufacturing containers having such apertures. For example, it may be difficult to properly align the aperture with the desired location on the container, such as the handle, on a consistent basis. Due to high throughput rates or the use of certain cutting means, the peripheral boundary of the aperture may include unsightly imperfections, such as rough edges, misaligned start/stop points, and/or wrinkles or folds in the sleeve material. Such misalignments and imperfections may communicate poor manufacturing and/or product quality to consumers.

One way that a manufacturer may address these challenges is to reduce the speed of the manufacturing line or invest in different equipment. However, these solutions may reduce production efficiency and/or result in increased costs.

There is a need, then, to provide improved containers that have a shrink sleeve aperture.

SUMMARY OF THE INVENTION

The present disclosure relates to containers that include a shrink sleeve with an aperture. For example, the present disclosure relates to a container at least partially surrounded by a shrink sleeve, the shrink sleeve including a shrink sleeve aperture, the shrink sleeve aperture being defined by an aperture peripheral boundary, the aperture peripheral boundary having a peripheral length, where a portion of the shrink sleeve adjacent to the aperture peripheral boundary has a first color; where a portion of the container adjacent to the aperture peripheral boundary is visible through the aperture, wherein the portion of the container has a second color, the portion of the container having the second color being located across the aperture peripheral boundary from the portion of the shrink sleeve having the first color, where the first color and the second color are substantially similar along at least about 10% of the peripheral length of the peripheral boundary.

The present disclosure also relates to processes for using and/or making such containers.

The present disclosure also relates to containers having apertured shrink sleeves, where the first and second colors are different.

BRIEF DESCRIPTION OF THE DRAWINGS

The drawings are meant to be illustrative in nature and are not intended to be limiting.

DETAILED DESCRIPTION OF THE INVENTION

The present disclosure relates to containers having shrink sleeves, where the shrink sleeve includes an aperture that exposes a portion or surface of the container. As described above, such apertures may lead to misalignments between the sleeve and the container, or imperfections at or near the periphery of the aperture, particularly when the manufacturing line is run at high speeds.

Figure 1:
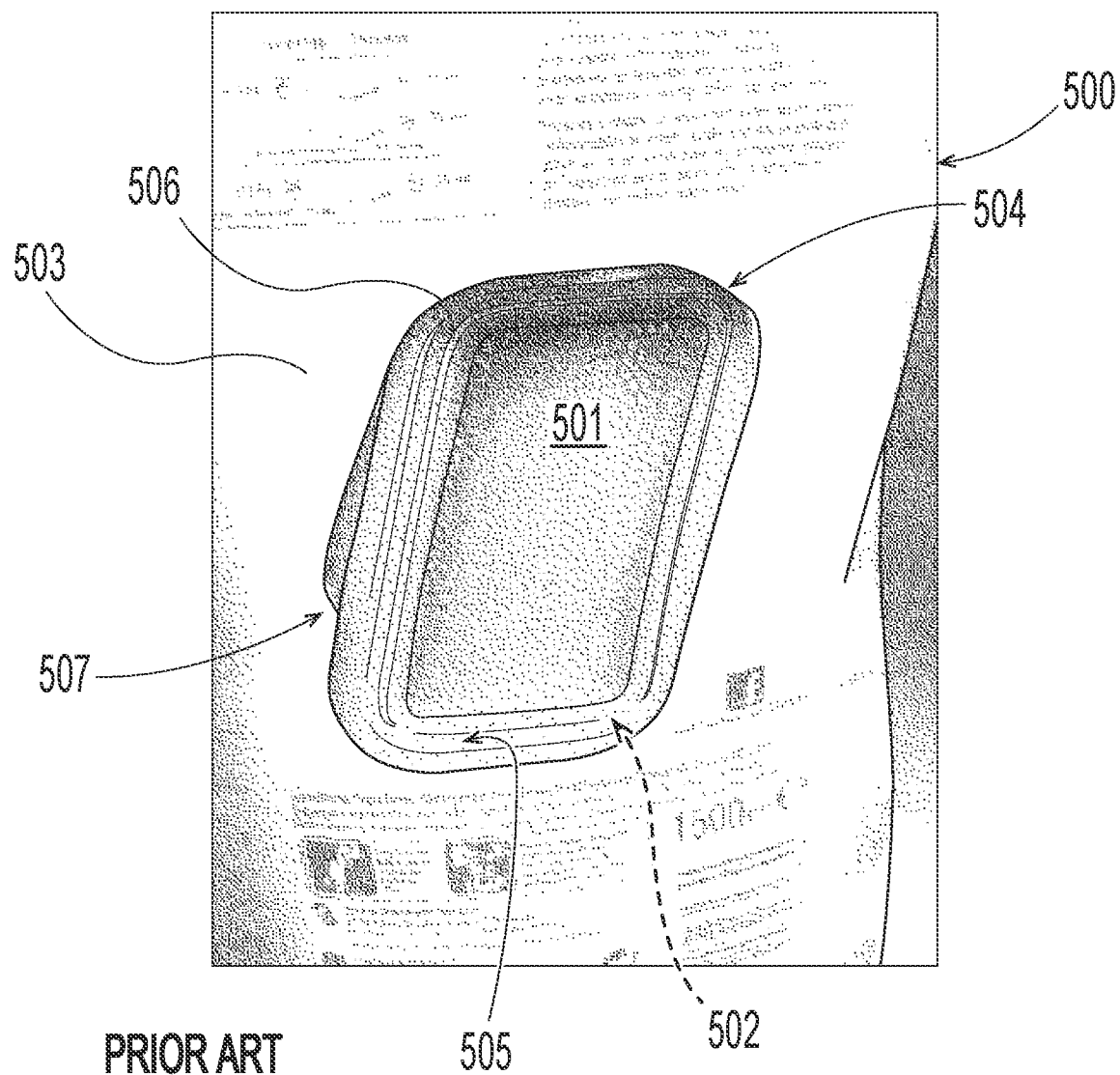
FIG. 1 shows a detail of a commercially available container of the prior art.

For example, FIG. 1 is a photograph showing a detail of a commercially available container of the prior art. The photograph shows a container 500 made of semi-translucent plastic material 501, with a colored liquid composition 502 (here, a pink laundry detergent) contained an interior volume of the container 500. The container 500 includes a shrink sleeve 503. The shrink sleeve 503 includes an aperture 504 that is substantially aligned with an indentation 505 that can serve as a pinch grip handle. Because the shrink sleeve 503 and the container 500 are not of substantially similar colors at a peripheral boundary 506 of the aperture 504, an imperfection 507 (shown in FIG. 1 as a rip or fold in the shrink sleeve 503) is readily noticeable.

The present disclosure provides containers and processes that can help the manufacturer mitigate any negative impressions that these challenges may cause in the minds of consumers without having to resort to slower line speeds or improved cutting machinery. In effect, by using containers and shrink sleeves that include the same or substantially similar colors, which may be measured by a ΔE value as described herein, in the vicinity of the aperture, it is believed that the visual impact of any misalignments and/or cutting imperfections are minimized.

The shrink-sleeved containers and related processes are discussed in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Container with Shrink Sleeve

The present disclosure relates to a container 100. The container 100 may have a top part 102, a base 104, and sides 106. The top part 102 is commonly the part of the container 100 that is provided with an opening for emptying and/or filling the bottle. A cap 110 may be selectively engageable with the container 100 so that the opening may be selectively sealed. The base 104 is typically the part of the container 100 on which the container is left to stand upright, and typically opposes the top part 102. The base 104 may be flat, or may be formed from a molded tripod, or from a flat ring. The sides 106 are typically the surfaces that connect the base 104 and the top part 102 of the container. The container 100 may include a front side 107, which may be intended to face a consumer when the container 100 is displayed for sale. Typically, when the container 100 is upright, the sides 106 are substantially vertical and substantially perpendicular to the base 104. The sides 106 may also have a curved or relatively complex shape depending on the container considered.

The container 100 may include an interior volume 108. The interior volume 108 may be bounded at least in part by the top part 102, the base 104, and the sides 106 of the container 100. The interior volume 108 may be from about 0.5 L to about 5 L, or from about 1 L to about 3 L. Containers having smaller volumes may not require a handle, and containers with larger volumes may have handles on a top part 102 of the container 100. When compositions 300 are intended to be poured out of relatively larger containers, the handle may be offset from the center of the container to facilitate pouring, for example located away from a longitudinal axis L.

The container 100 may be made of any suitable container material 112. Suitable container materials 112 may include any suitable plastic resin material. Suitable plastic resin materials may include polyolefins (such as polypropylene and/or polyethylene), polystyrene (PS), polyvinyl chloride (PVC), polylactic acid (PLA) or polyethylene terephthalate (PET). The plastic resin material may be polyethylene terephthalate (PET). The container material may be made of sustainable materials selected from the group consisting of renewable materials, recycled materials, regrind materials, and mixtures thereof. Examples of "renewable materials" include bio-polyethylene, bio-polyethylene terephthalate, and bio-polypropylene. As used herein and unless otherwise stated, "polyethylene" encompasses high density polyethylene (HDPE), low density polyethylene (LDPE), linear low density polyethylene (LLDPE), and ultra low density polyethylene (ULDPE), and "polypropylene" encompasses homopolymer polypropylene, random copolymer polypropylene, and block copolymer polypropylene. Examples of "recycled" materials may include post-consumer recycled (PCR) materials, post-industrial recycled (PIR) materials, and mixtures thereof. Examples of "regrind" material may include thermoplastic waste material, such as sprues, runners, excess parison material, and reject parts from injection and blow molding and extrusion operations, which has been reclaimed by shredding or granulating.

The containers 100 of the present disclosure may be made by any suitable process, such as blow molding, thermoforming, injection molding, and combinations thereof. Preferably, the container is made by a blow molding process.

The container 100 may include a handle 120. The handle 120 may be on the side 106 of the container 100. The handle 120 may be selected from a pinch grip 122 or a through handle 123.

Figure 2:
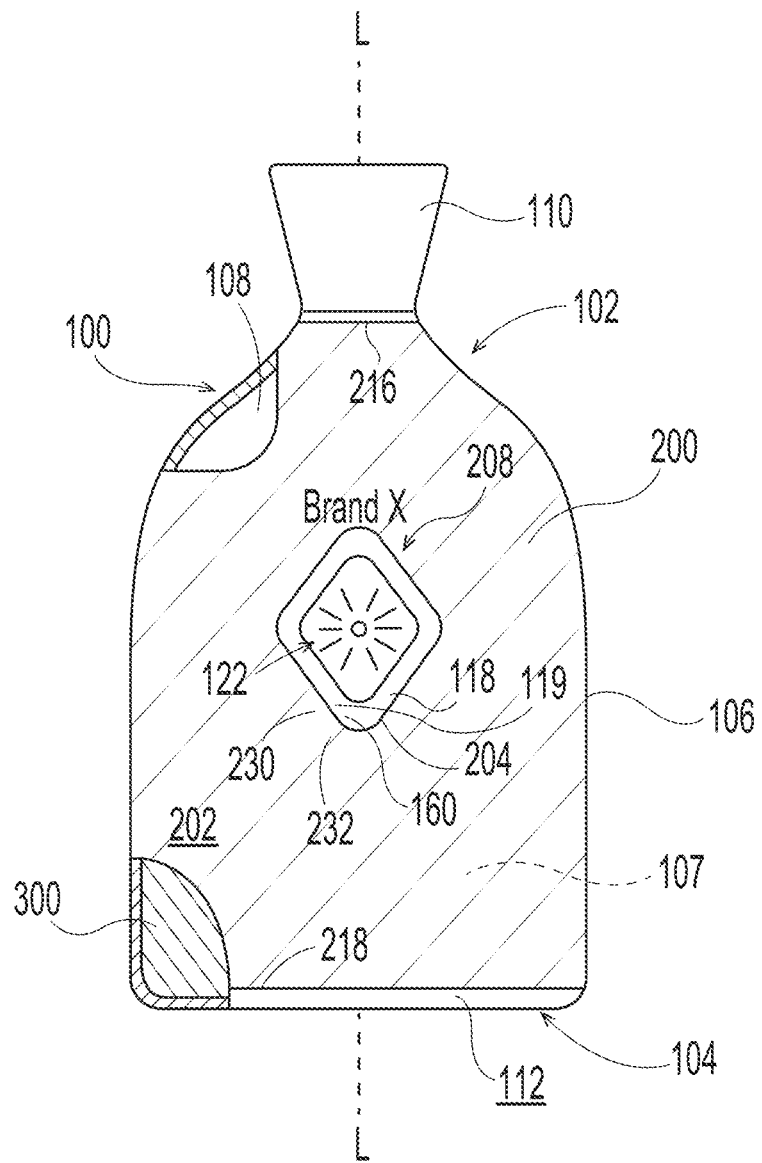
FIG. 2 shows a shrink-sleeved container, having a pinch grip handle, according to the present disclosure.
Figure 3:
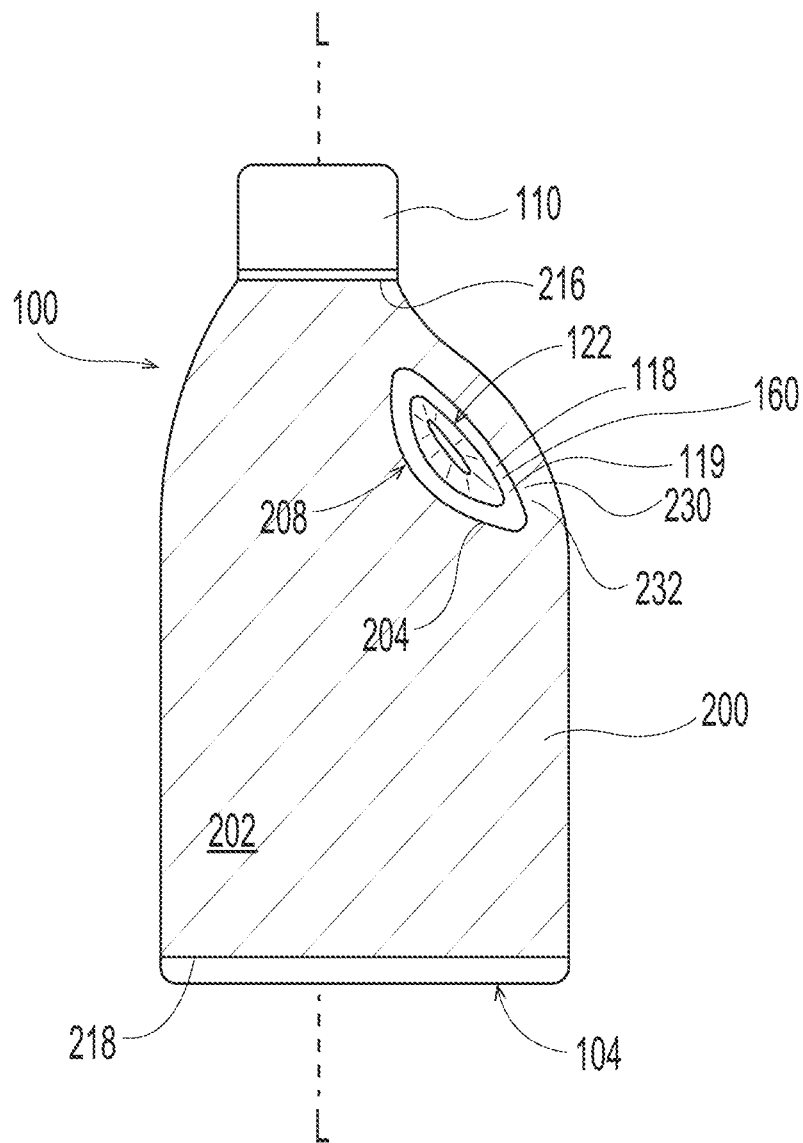
FIG. 3 shows a shrink-sleeved container, having a pinch grip handle, according to the present disclosure.

The container 100 may include a pinch grip 122. A pinch grip 122 may be formed from indentations on one or more sides 106 of the container 100. As shown in FIG. 2, a pinch grip 122 may be substantially centered on a longitudinal axis L of the container 100 that runs from the top part 102 to the base 104 of the container. The pinch grip 122 may be located, at least in part, on a front side 107 of the container 100. As shown in FIG. 3, the pinch grip 122 may be located on a front side 107, but away from the longitudinal axis L.

Figure 4:
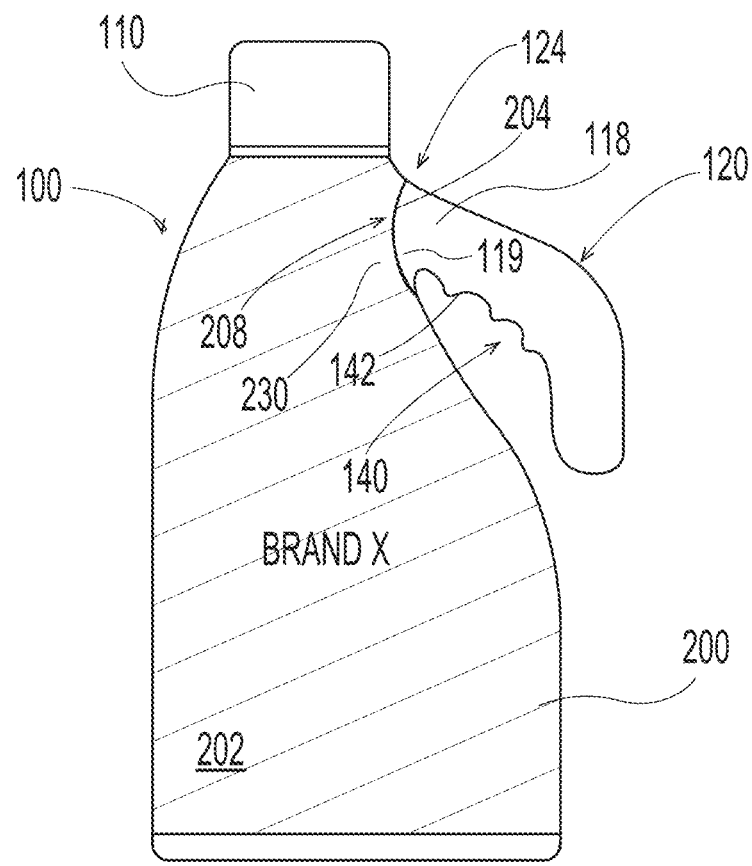
FIG. 4 shows a shrink-sleeved container with a handle according to the present disclosure.
Figure 5:
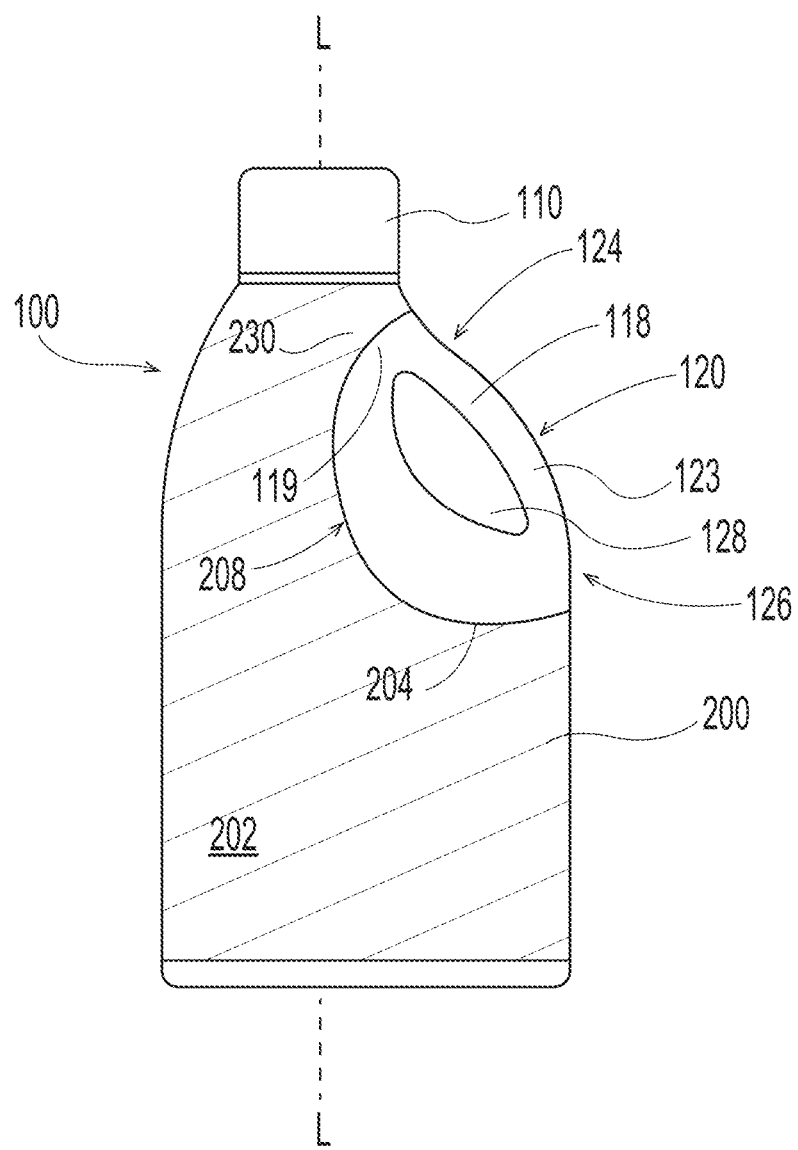
FIG. 5 shows a shrink-sleeved container, with a through handle, according to the present disclosure.

The container 100 may include a through handle 123. As shown in FIG. 4, the through handle 123 may have a first merged portion 124, where the through handle 123 joins the rest of the container 100. As shown in FIG. 5, the through handle 123 may have a first merged portion 124 and a second merged portion 126. The through handle 123 may be located away from a longitudinal axis L.

Figure 6:
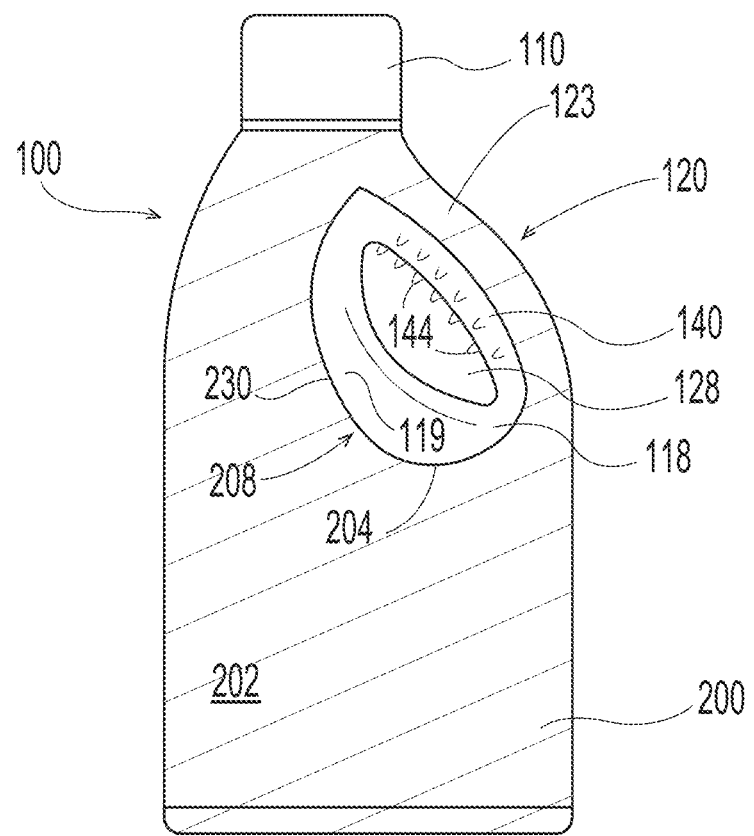
FIG. 6 shows a shrink-sleeved container, with a through handle, according to the present disclosure.

The handle 120 may include surface irregularities 140. Surface irregularities 140 can help to make the handle 120 easier to grip. Surface irregularities 140 may include bumps, dimples, ribs, contours, or combinations thereof. FIG. 4 shows a handle 120 having surface irregularities 140 in the form of contours 142 sized and configured to receive adult human fingers. FIG. 6 shows a handle 120 having surface irregularities 140 the form of bumps 144.

Figure 7:
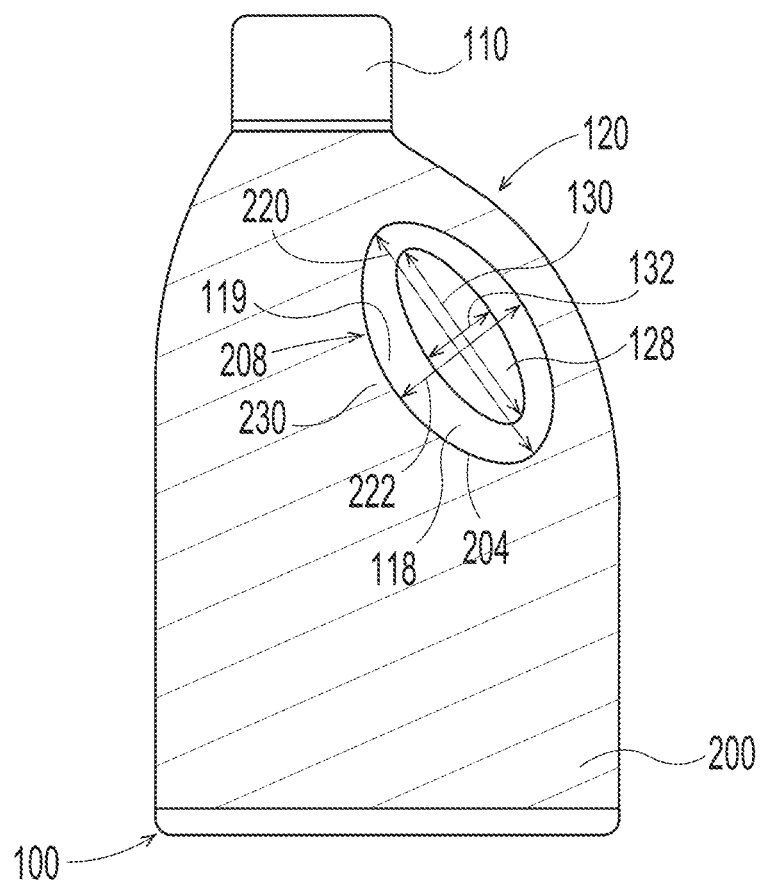
FIG. 7 shows a shrink-sleeved container, with a through handle, according to the present disclosure.

As shown in FIGS. 4, 5, and 6, the container may include a through hole 128. A user may use the through hole 128 to maintain a better grip on the container 100. Thus, the through hole 128 may be sized and dimensioned to fit at least a human finger, or even an adult human hand. The through hole 128 may be a circle, or it may not be a circle. A circular shape may not be preferred, as it may not be best dimensioned to comfortably fit an adult's hand due to a tight radius. As shown in FIG. 7, the through hole 128 may have a major through hole dimension 130, the largest distance that may be measured in the through hole 128. The through hole 128 may have a minor through hole dimension 132, the smallest distance that may be measured in the through hole 128. The major through hole dimension 130 may be greater than the minor through hole dimension 132, thereby providing a shape which may be advantageous for comfortably receiving a human hand. The through hole 128 may have a through hole area, which is the area of the smallest plane that will fit in the through hole 128 while leaving no spaces.

The present disclosure also relates to shrink sleeves. A shrink sleeve 200 may at least partially surround the container 100. A container 100 at least partially surrounded by a shrink sleeve 200, and optionally containing a composition 300, may be considered a container system according to the present disclosure. The shrink sleeve 200 may at least partially surround the sides 106 of the container 100, but may be open near the top part 102 and/or base 104. Outer edges 216, 218 of the shrink sleeve may be near the top part 102 and/or the base 104 of the container 100. Typically, once applied as intended, the shrink sleeve 200 substantially conforms to the shape of the container 200.

The shrink sleeve 200 may be formed from any suitable sleeve material 202. Suitable sleeve materials 202 may include thermoplastic materials, such as polyvinyl chloride (PVC), polyester tetra phthalate (PET), oriented polypropylene (OPP), and oriented polystyrene (OPS). The shrink sleeve 200 may comprise one layer or a plurality of layers, such as laminated layers. The plurality of layers may include a first layer and a second layer, where the first and second layers may be made from different materials. For example, an outer layer may be selected to be suitable to be printed upon.

The shrink sleeve 200 may comprise an aperture 208. A portion of the shrink sleeve 200, for example a predetermined removeable portion, may be removed to form the aperture 208. The aperture 208 may be at any desired location on the sleeve. Typically, the predetermined removeable portion of the sleeve 200 is remote from an outer edge 216, 218 of the sleeve 200. In such cases, the aperture 208 forms a through hole in the sleeve 208. The aperture 208 may be at or near an outer edge 216, 218 of the sleeve 200.

The aperture 208 may be formed by any suitable process. Typically, a cutting process is used to cut or score the shrink sleeve 200, and a predetermined removeable portion is removed, thereby forming the aperture 208. The cutting process may include cutting by a cutter, such as a laser, a blade, a die, or other tooling capable of cutting a predetermined removeable portion from the shrink sleeve 208. The removal process may include removal by a striker, by vacuum, or by other suitable means.

The cutting and/or removal process may occur before or after the shrink sleeve 200 has been provided to the container 100. Removing the portion of the shrink sleeve 200 before it has been provided to the container 100 may be relatively easier and/or require less machinery. Removing the portion of the shrink sleeve 200 after it has been provided to the container 100 may help to ensure proper alignment with the container 100, e.g., the handle 120.

The aperture 208 may be defined by an aperture peripheral boundary 204. The aperture peripheral boundary 204 may have a peripheral length, measured as the perimeter of the aperture peripheral boundary 204.

The aperture peripheral boundary 204 may include a boundary imperfection 205. The boundary imperfection 205 may be a tear, an unintended cut, a rough edge, a hanging chad, a fold, a misalignment with the container, or other undesired feature.

Figure 9:
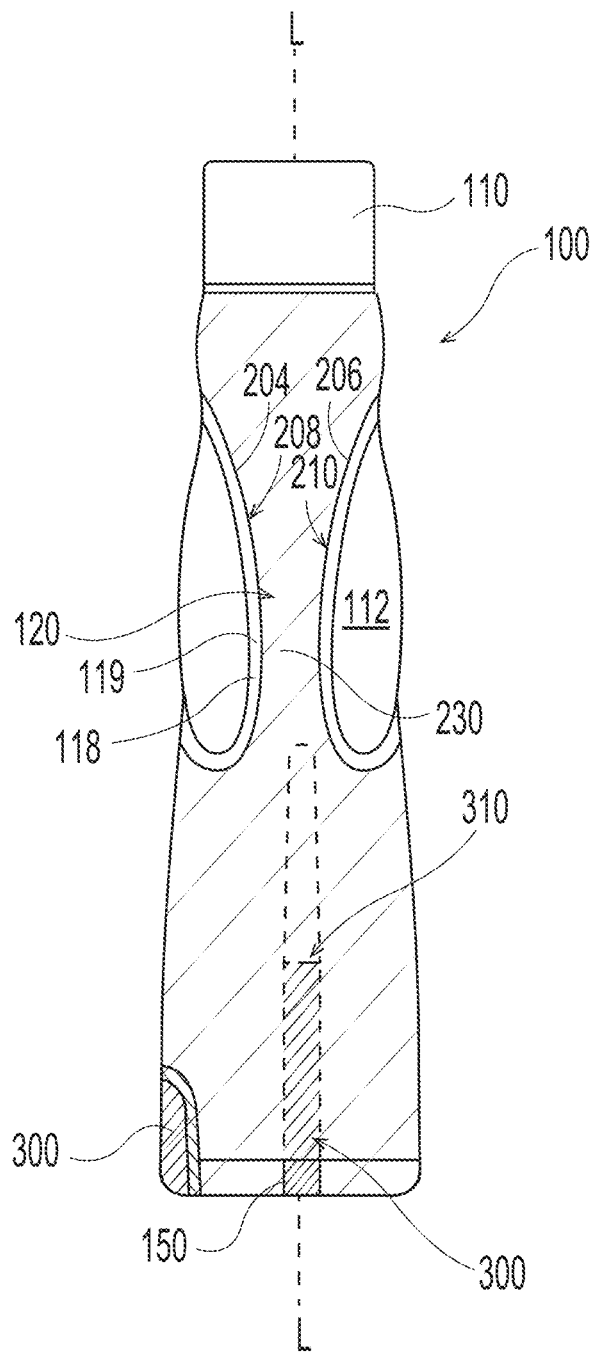
FIG. 9 shows a shrink-sleeved container according to the present disclosure, with a window, as viewed from the side with a handle.

The shrink sleeve may comprise at least two apertures 208, 210. The apertures 208, 210 may be substantially symmetrical. As shown in FIG. 9, the apertures 208, 210 may be on opposing sides of a handle 120.

The aperture 208 may have a major aperture dimension 220. The aperture 208 may have a minor aperture dimension 222. When the container 100 includes a through hole 128, the major and minor aperture dimensions 220, 222 of the aperture 208 may be substantially aligned with, and typically greater than, the major and minor through hole dimensions 130, 132, respectively, of the through hole 128. The length of the major aperture dimension 220 may be less than about 400%, or less than about 300%, or less than about 200% than the length of the major through hole dimension 130. The length of the minor aperture dimension 222 may be less than about 400%, or less than about 300%, or less than about 200% than the length of the minor through hole dimension 132.

When the shrink sleeve 200 at least partially surrounds the container 100, a surface 118 of the container 100 may be exposed through the aperture 208. By "exposed," it is meant that at least part of the surface 118 is visible. The surface 118 may include a portion 119 of the container 100 that is adjacent to the aperture peripheral boundary 204 and is visible through the aperture 208.

The exposed surface 118 may include at least a portion of a handle 120. As shown in FIGS. 1 and 2, the exposed surface 118 may include at least a portion of a pinchgrip handle 122. As shown in FIGS. 3-6, the exposed surface 118 may include at least a portion of a through handle 123, which may include a first merged portion 124 and perhaps a second merged portion 126. The exposed surface 118 may be adjacent or even surround a through hole 128. The exposed surface 118 may include surface irregularities 140.

It may be beneficial for the portions of the shrink sleeve 200 and the exposed surface 118 to be of the same or similar colors, which may be determined by the ΔE value as discussed below, in areas adjacent to the edge 204. As described above, such color selection may allow the manufacturer to increase production efficiency and/or minimize capital investment. It may be desirable for the same or similar colors to extend along the aperture peripheral boundary 204 for a fraction, a majority, or even the entire peripheral length in provide a uniform visual impression. Additionally, it may be desirable for the same or similar colors to extend (perpendicularly) away from the aperture peripheral boundary 204 in one or both directions (e.g., on the container 100 and/or on the sleeve 200) to provide a larger uniformly colored area. However, it may be desirable to limit the extended area, at least somewhat, so that graphics or text that use contrasting colors may also be employed.

The shrink sleeve 200 may comprise a portion 230 that is adjacent to the aperture peripheral boundary 204 of the aperture 208. The portion 230 may have a first color 232. The portion 230 of the sleeve 200 having a first color 232 may be continuous or discontinuous along the aperture peripheral boundary 204. In the FIGS. 2-9, although the first and second colors 232, 160 are generally intended to be substantially similar, the first color 232 of the sleeve 200 is shown with light shading marks to help distinguish the sleeve 200 from the container 100. That being said, the markings on the drawings are for non-limiting illustration only, and the containers and/or sleeves of the present disclosure need not be a single color throughout.

It is understood that other portions of the sleeve 200 may include colors that are the same as or different from the first color 232. For example, other portions of the sleeve may include ornamental designs, branding information, usage instructions, etc., in color(s) that are the same or different from the first color 232. When the other sleeve portions include colors that are different from the first color 232, the other portions may be located away from the aperture peripheral boundary 204.

The portion 230 of the shrink sleeve 200 may be adjacent the aperture peripheral boundary 204 along a fraction of the peripheral length, or along the entire peripheral length. The portion 230 of the shrink sleeve 200 having a first color 232 be adjacent to the aperture peripheral boundary 204 for at least about 25%, or at least about 50%, or at least about 75%, or at least about 90%, or about 100% of the peripheral length of the aperture peripheral boundary 204.

The portion 230 of the shrink sleeve 200 having the first color 232 may include the first color 232 along a sleeve depth dimension 234. The sleeve depth dimension 234 is determined from a point 265 on the aperture peripheral boundary 204, and is typically measured along a length that orthogonally extends away from point 265 on the aperture peripheral boundary 204 and away from the surface 118 of the container 100 that is visible through the aperture 208. The sleeve depth dimension 234 having the first color 232 may be different at different points along the aperture peripheral boundary 204. The portion 230 of the shrink sleeve 200 having a first color 232 may form an annulus or a partial annulus, as defined by the aperture peripheral boundary 204 and the sleeve depth dimension 234, and may encircle or partially encircle the aperture 208.

Where the aperture 208 has a minor aperture dimension 222, the sleeve depth dimension 234 characterizing the portion 230 having the first color 232 may be at least about 1%, or at least about 3%, or at least about 5%, or at least about 7%, or at least about 10% of the minor aperture dimension 222. The sleeve depth dimension 234 may be up to about 100% or more, or up to about 75%, or up to about 50%, or up to about 35%, or up to about 25%, or up to about 20%, or up to about 15%, or up to about 10%, or up to about 5% of the minor aperture dimension 222.

The sleeve depth dimension 234 characterizing the portion 230 having the first color 232 may be at least about 2 mm, or at least about 5 mm, or at least about 10 mm, or at least about 15 mm, or at least about 20 mm. The sleeve depth dimension 234 may be up to about 50 mm or more, or up to about 40 mm, or up to about 25 mm, or up to about 20 mm, or up to about 15 mm, or up to about 10 mm, or up to about 5 mm.

A portion 119 of the 118 surface of the container 100 visible through the aperture 208 may have a second color 160. The portion 119 having a second color 160 may be continuous or discontinuous along the aperture peripheral boundary 204.

The portion 119 of the container 100 having the second color 160 may be located across the aperture peripheral boundary 204 from the portion 230 of the shrink sleeve 200 having the first color 232. The portion 119 of the container 100 having the second color 160 may be on a side of a point 265 on the aperture peripheral boundary 204 that is opposite the portion 230 of the shrink sleeve 200 having the first color 232. The portion 119 of the container 100 having the second color 160 may be adjacent to the portion 230 of the shrink sleeve 200 having the first color 232. When the first color 232 and the second color 160 are substantially similar, such orientations may result in a relatively uniform visual appearance and/or may make boundary imperfections 205 in the aperture peripheral boundary 204 challenging to perceive.

It is understood that other portions of the container 100, including other portions of the surface 118 that is exposed through the aperture 208, may include colors that are the same as or different from the second color 160. When the other surface portions include colors that are different from the second color 160, the other portions may be located away from the aperture peripheral boundary 204.

The portion 119 of the container 100 having the second color 160 may be adjacent the aperture peripheral boundary 204 along a fraction of the peripheral length, or along the entire peripheral length. The portion 119 of the container 100 having a second color 160 may be adjacent to the aperture peripheral boundary 204 for at least about 25%, or at least about 50%, or at least about 75%, or at least about 90%, or about 100% of the peripheral length.

The portion 119 having the second color 160 may include the second color along a container depth dimension 162 of the portion 119. The container depth dimension 162 is determined from a point 265 on the aperture peripheral boundary 204, and is typically measured along a length that orthogonally extends away from the point 265 on the aperture peripheral boundary 204 and away from the sleeve 200. The container depth dimension 162 of the portion 119 having the second color 160 may be different at different points along the aperture peripheral boundary 204. The portion 119 of the container 100 having the second color 160 may form an annulus or a partial annulus, as defined by the aperture peripheral boundary 204 and the container depth dimension 162.

Where the aperture 208 has a minor aperture dimension 222, the container depth dimension 162 of the portion 119 having the second color 160 may be at least about 1%, or at least about 3%, or at least about 5%, or at least about 7%, or at least about 10% of the minor aperture dimension 222. The container depth dimension 162 may be up to about 100% or more, or up to about 75%, or up to about 50%, or up to about 35%, or up to about 25%, or up to about 20%, or up to about 15%, or up to about 10%, or up to about 5% of the minor aperture dimension 222.

The container depth dimension 162 of the portion 119 having the second color 162 may be at least about 2 mm, or at least about 5 mm, or at least about 10 mm, or at least about 15 mm, or at least about 20 mm. The container depth dimension 162 may be up to about 50 mm or more, or up to about 40 mm, or up to about 25 mm, or up to about 20 mm, or up to about 15 mm, or up to about 10 mm, or up to about 5 mm.

Figure 8:
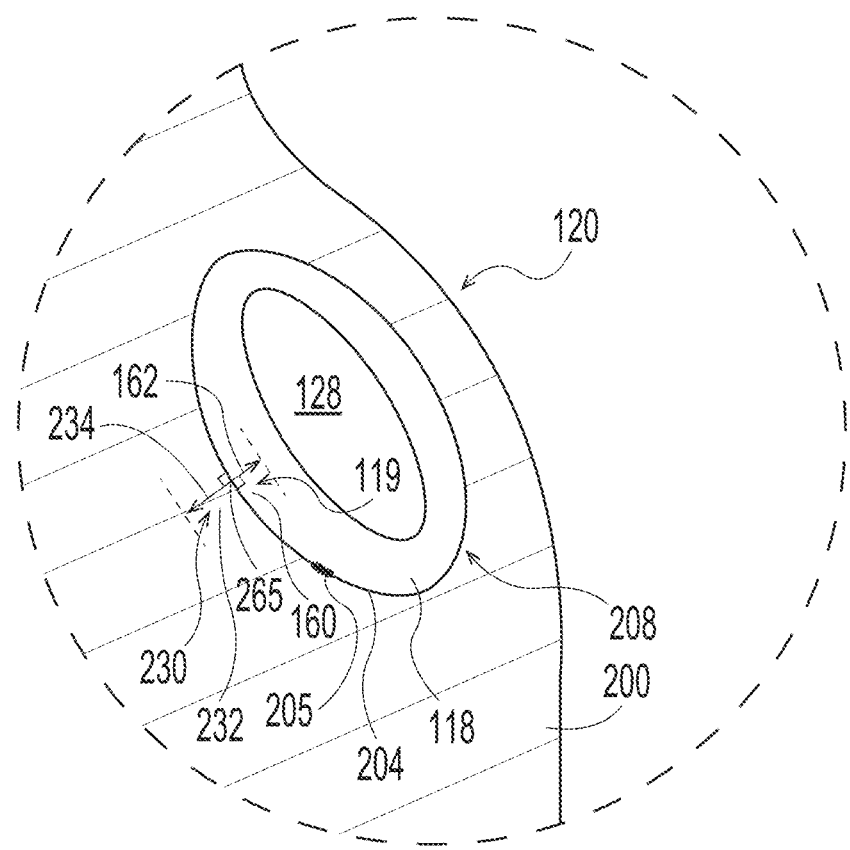
FIG. 8 shows a detail of a shrink-sleeved container according to the present disclosure.

FIG. 8 shows a close-up view of a container according to the present disclosure, such as the container 100 of FIG. 7. The container 100, which includes a handle 120 and a through hole 128, is partially surrounded by a shrink sleeve 200. The shrink sleeve includes an aperture 208, defined by an aperture peripheral boundary 204, which includes an imperfection 205 in the form of a rough edge. A portion 230 of the shrink sleeve 200 that is adjacent to the aperture peripheral boundary 204 has a first color 232. A surface 118 of the container 100 is visible through the aperture 208, and a portion 119 of the surface 118 is adjacent to the aperture peripheral boundary 204; the portion 119 has a second color 160. The portion 119 of the container 100 having the second color 160 is located across the aperture peripheral boundary 204 from the portion 230 of the shrink sleeve 208 having the first color 232. A sleeve depth dimension 234 and a container depth dimension 162 can be determined from a point 265 on the aperture peripheral boundary 204; each dimension 234, 162 extends, at a maximum, as far as the first color 232 and the second color 160, respectively reach.

The first color 232 and the second color 160 may be substantially similar. It is understood that because the first and second colors 232, 160 are on different materials (e.g., a shrink sleeve 200 and a container 100, respectively), the first and second colors 232, 160 may not be identical. However, for imperfections 205 at the aperture peripheral boundary 204 to be less noticeable, the first and second colors 232, 160 should be substantially similar, for example, when viewed at eye-level, at a one meter distance, under artificial/fluorescent lighting (thereby approximating, for example, a consumer's visual experience at a grocery store, convenience store, or pharmacy).

The first color 232 and the second color 160 may be the same color, for example white, black, red, orange, yellow, green, purple. The first and second colors 232, 160 may be white, which may be desirable to convey a sense of clean and/or purity to a consumer.

The first and/or second colors 232, 160 may be measured and compared empirically. For example, a color (e.g., the first color 232 and/or the second color 160) may be measured by the reflectance spectrophotometer according to the colors L*, a*, and b* values. The difference in the first and second colors 232, 160 (and/or a third color and/or a fourth color, if present) may be described in terms of ΔE.

Reflectance color is measured using a Hunter Reflectance Meter test that employs the Hunter Lab LabScan XE reflectance spectrophotometer obtained from Hunter Associates Laboratory of Reston, Va. A surface is tested at an ambient temperature between 65° F. and 75° F., and a relative humidity between 50% and 80%.

The spectrophotometer is set to the CIELab color scale and with a D65 illumination. The Observer is set at 10° and the Mode is set at 45/0°, Area View is set to 0.125", and Port Size is set to 0.20". The spectrophotometer is calibrated prior to sample analysis using the black glass and white reference tiles supplied from the vendor with the instrument. Calibration is done according to the manufacturer's instructions as set forth in LabScan XE User's Manual, Manual Version 1.1, August 2001, A60-1010-862. If cleaning is required of the reference tiles or samples, only tissues that do not contain embossing, lotion, or brighteners should be used (e.g., PUFFS tissue).

The first color 232 and the second color 160 can have a difference in color, ΔE. The difference may be calculated using L*, a*, and b* values by the formula $\Delta E = [(L^*_X - L^*_Y)^2 + (a^*_X - a^*_Y)^2 + (b^*_X - b^*_Y)^2]^{1/2}$, where the ΔE of the first color and the second color is less than about 10, or less than about 7.5, or less than about 5, or less than about 3, or is equal to or less than about 2, or equal to or less than about 1. Herein, the "X" in the equation can represent the portion 230 of the sleeve 200 or the portion 119 of the container 100. Herein, the "Y" in the equation can represent the other of the portion 230 of the sleeve 200 or the portion 119 of the container 100. "X" and "Y" are not to be the same surface. In other words, for any particular evaluation of the difference in color, the location of "X" is not the same as the location of "Y".

The first color 232 of the portion 230 of the shrink sleeve 200 is to be determined while on the container 100, as that is how it appears to the consumer or manufacturer, post-production. The container 100 may be dissembled, cut into pieces, etc., as necessary in order for the measurements to be taken.

According to some sources, the magnitude of ΔE between two colors can result in the following perception differences, as shown in Table 1.

TABLE 1

| Delta E | Perception |
| --- | --- |
| ≤1.0 | Not perceptible by human eyes. |
| 1-2 | Perceptible through close observation. |
| 2-10 | Perceptible at a glance. |
| 11-49 | Colors are more similar than opposite |
| 100 | Colors are exact opposite |

A difference in color of ΔE that is less than about 10, or less than about 7.5, or less than about 5, or less than about 3, or is equal to or less than about 2, or equal to or less than about 1, provides a difference in color, if any, that is substantially indistinct to an observer, particularly if a shrink-sleeved container is not studied closely as might occur in a purchasing context when faced with a multitude of choices. The smaller the ΔE between the first color 232 and the second color 160, the less readily distinguishable the two colors are.

By having a ΔE between the first color 232 and the second color 160 that is less than about 10, or less than about 7.5, or less than about 5, or less than about 3, or is equal to or less than about 2, or equal to or less than about 1, there is little visual contrast between the sleeve 200 and the exposed surface 118 of the container in the vicinity of the aperture peripheral boundary 204. Because the sleeve 200 and the exposed surface 118 of the container 100 are more likely to blend together visually when viewed by a consumer, a manufacturer can have greater tolerances for misalignments between the sleeve 200 and the container 100 and/or for boundary imperfections 205, such as rough or torn edges.

The first and/or second color 232, 160 may have a L* value greater than about 80. Such a light color may be desirable for containers 100 and/or sleeves 200 because it can signal cleanliness and/or a lack of stains to a consumer. The first and/or second color 232, 160 may have a L* value greater than about 80, an a* value between about −5 and about 5, and a b* value between about −5 and about 5.

The first and/or second color 232, 160 may be white. Both the first and second colors 232, 160 may be white. When using a reflectance spectrophotometer, the color white is defined herein as a color having a L* value greater than about 80, an a* value equal to about 0±2, and a b* value equal to about 0±2.

The first and/or second color 232, 160 may be purple. Both the first and second colors 232, 160 may be purple. When using a reflectance spectrophotometer, the color purple may be described, as a non-limiting example, as a color having a L* value of from about 50±20, an a* value of about 40±10, and a b* value of about −40±10.

The sleeve 200 and/or surface 118 of the container 100 visible through the aperture 208 may independently include more than one color. However, it may be preferred that the colors of the sleeve 200 and the surface 118 of the container 100 still substantially match at any given point along the aperture peripheral boundary 204. For example, the sleeve 200 may include a second portion adjacent to the aperture peripheral boundary 204, and the second portion may have a third color. The surface 118 of the container 100 visible through the aperture 208 may have a second portion adjacent the aperture peripheral boundary 204, and the second portion of the surface may have a fourth color. The second portion of the sleeve and the second portion of the exposed surface may be proximate to each other, for example adjacent to each other and/or on opposite sides of a point on the aperture peripheral boundary 204. The third color and the fourth color may be similar or the same, as determined by the ΔE value, as discussed below.

The container 100 may contain a composition 300 in its interior volume 108. The composition 300 may be in the form of a powder, a compacted powder, a liquid, a single- or multi-compartmented unitized dose article, or a mixture thereof. The composition 300 may be a flowable composition, such as a liquid or granular composition, typically a liquid composition. By "liquid," it is herein meant any composition capable of wetting and treating a substrate and encompasses forms such as dispersions, gels, pastes and the like. A dispersion, for example, is a liquid comprising solid or particulate matter contained therein. The liquid composition may also include gases in suitably subdivided form.

The composition 300 may be a household care composition, for example a liquid household care composition. The household care compositions may be suitable for manual treatments, automatic treatments, and/or treatments with the use of a device. Household care compositions can include fabric care compositions and/or dishwashing compositions.

By "fabric care composition," it is herein meant compositions that provide cleaning benefit to fabrics, care benefit to fabrics or a mixture thereof. The fabric care composition may provide a cleaning benefit selected from stain removal, stain-repellency, anti-soil-redeposition, brightening, whitening dirt removal, malodour reduction or mixtures thereof. The fabric care composition may provide a care benefit selected from softening, freshness, anti-wrinkling, anti-colour fading, dye transfer inhibition, anti-static or mixtures thereof. Suitable commercially available fabric care compositions may include those sold under the trade names TIDE, GAIN, ARIEL, LENOR, and/or DOWNY, each available from The Procter & Gamble Company, Cincinnati, Ohio, USA.

By "dishwashing composition," it is herein meant dishwashing compositions that provide cleaning benefits, care benefits or a mixture thereof. "Dishwashing composition" may be a composition that can provide shine, fast drying, metal, glass or plastic protection benefits. Suitable commercially available dishwashing compositions may include those sold under the trade names DAWN and/or CASCADE, each available from The Procter & Gamble Company, Cincinnati, Ohio, USA.

The composition 300 may comprise anionic surfactants, non-ionic surfactants, cationic surfactants, polyethylene glycol polymers, ethoxylated polyethyleneimines, rheology modifier, hueing dyes, perfumes, perfume microcapsules, chelants, enzymes, silicones, polyolefin waxes, latexes, oily sugar derivatives, cationic polysaccharides, polyurethanes, fatty acids, enzyme stabilizing systems, antioxidants, opacifier, pearlescent agent, deposition aid, builder, bleaching agent, bleach activator, bleach catalyst, organic shine polymers, surface modifying polymers, metal care agents, metal salts, anti-corrosion agents and mixtures thereof.

The composition 300 may be a liquid composition. The liquid composition may have a viscosity of from about 1 to about 2000 centipoise (1-2000 mPa·s), or from about 100 to about 1200, or from about 200 to about 800 centipoise (200-800 mPa·s). The viscosity is determined using a Brookfield viscometer, No. 2 spindle, at 60 RPM/s, measured at 25° C. When a container 100 contains such viscous compositions, it may be beneficial to have an aperture 208 in the shrink sleeve 200 that exposes a surface 118 of the container 100, particularly a handle 120. This is because the exposed surface 118 may provide an improved gripping surface, which may be particularly useful if a portion of the viscous composition 600 spills or drips onto the sleeve 200, thereby making it slippery.

As seen in FIG. 9, the container 100 may include a window 150. The window 150 may be at least partially translucent or transparent. The window 150 may be formed from a material that is different from the rest of the container material 112. The window 150 may be formed from container material 112 that is thinner at the window 150 than at other parts of the container 100. The flowable composition 300 may be visible through the window 150. A volume level 310 of the composition 300 may be visible in the window 150, which may be useful to the consumer for estimating how much composition 300 remains in the container 100. The composition 600 may have a color that contrasts with the color of the sleeve 200 that covers the window 150. A portion of the sleeve 200 may be removed to expose some or all of the window 150. The sleeve material 202 may be selected so that it has an opacity or translucence measurement that allows the composition 300 and/or volume level 310 to be seen through the sleeve 200.

While the present disclosure has thus far discussed shrink-sleeved containers that employ similar first and second colors to make imperfections at the boundary of the shrink sleeve's aperture less noticeable, it is understood that the concept may be turned on its head to serve a different purpose. For example, it may be desirable to provide shrink sleeves and containers having first and second colors, respectively, that are different. A difference in such colors may make imperfections in the sleeve's aperture more noticeable, thereby making quality control determinations relatively easier compared to if the first and second colors were similar.

Thus, the present disclosure relates to a container as substantially described above, except wherein the first and second color are different, preferably noticeably different. In such containers, the $\Delta E$ between the first color and the second color may be greater than about 10, or greater than about 15, or greater than about 20, or greater than about 30, or greater than about 40, or greater than about 50. The greater the $\Delta E$ value, the greater the perceived difference in the colors, and, it is believed, the easier to see imperfections in the edge of the aperture.

Process

The present disclosure also relates to a process for preparing a container comprising an apertured shrink sleeve, such as those described above.

The process includes the step of providing a shrink sleeve to a container, typically so that shrink sleeve at least partially surrounds the container. Suitable containers and shrink sleeves are discussed in more detail above.

A container can be provided on a conveyor. A shrink sleeve can be applied to the container before or after filling and or capping of the container. Most commonly, a shrink sleeve is applied to the container prior to filling and capping. The container can be filled by a filling device before or after the container arrives at a sleeve handling device and heating zone. The container can be filled with a composition. Exemplary compositions can include powders, granules, liquids, and gels.

A shrink sleeve may be applied to the container at some location on a shrink sleeving line. The shrink sleeve can be applied to the container up-line of the location at which the container is filled. A shrink sleeve can be provided to the shrink sleeving line in a continuous web of multiple shrink sleeves. An individual shrink sleeve can be cut from the web, opened, and then placed over the container. This operation may be done using a shrink sleeve handling device.

Once the shrink sleeve is applied to the container, the container and shrink sleeve applied thereto may be passed through a heating zone. Within the heating zone, the temperature of the shrink sleeve may be increased to a temperature at which the shrink sleeve shrinks and conforms to the container.

A predetermined removeable portion can be provided in the shrink sleeve. The predetermined removeable portion can be provided in the shrink sleeve prior to the shrink sleeve being applied to the container or after the shrink sleeve is conformed to the container. After the shrink sleeve is conformed to the container, a predetermined removeable portion can be provided by cutting the shrink sleeve. The shrink sleeve can be cut at the predetermined removeable portion by a cutter, such as a laser, a blade, a die, or other tooling capable of cutting a predetermined removable portion from the shrink sleeve. The predetermined removable portion may be removed, for example, by a striker, by vacuum, or by other suitable means.

Processes for making containers with apertured shrink sleeves are described in more detail in, for example, U.S. Pat. No. 9,751,258 and US2014/0290827, both of which are incorporated herein by reference.

The aperture of the sleeve is defined by an edge. A portion of the sleeve adjacent the edge has a first color, as discussed above.

When the sleeve has been provided to the container and at least partially surrounds it, a surface of the container is exposed through the aperture. A portion of the exposed surface adjacent the edge has a second color, as described above. The exposed surface may include at least a portion of a handle. The handle may be a pinchgrip handle or a through handle. The handle may include surface irregularities.

The first color and the second color may be measured by a Hunter Reflectance Meter test according to the colors L*, a*, and b*. The first and second colors may have a difference in color calculated using L*, a*, and b* values by the formula $\Delta E=[(L^*_X-L^*_Y)^2+(a^*_X-a^*_Y)^2+(b^*_X-b^*_Y)^2)^7]^{1/2}$. The ΔE between the first color and the second color may be less than about 10, or less than about 7.5, or less than about 5, or less than about 3, or is equal to or less than about 2, or equal to or less than about 1.

The container 100 may have an interior volume 108. A composition 300, typically a flowable composition, may be provided to the interior volume 108. The composition 300 may be a household care composition, for example a liquid household care composition. The household care compositions may be suitable for manual treatments, automatic treatments, and/or treatments with the use of a device. Household care compositions include fabric care compositions and dishwashing compositions. Such compositions are described more fully above.

COMBINATIONS

Specifically contemplated combinations of the disclosure are herein described in the following lettered paragraphs. These combinations are intended to be illustrative in nature and are not intended to be limiting.

A. A container at least partially surrounded by a shrink sleeve, the shrink sleeve comprising a shrink sleeve aperture, the shrink sleeve aperture being defined by an aperture peripheral boundary, the aperture peripheral boundary having a peripheral length, wherein a portion of the shrink sleeve adjacent to the aperture peripheral boundary has a first color; wherein a portion of the container adjacent to the aperture peripheral boundary is visible through the aperture, wherein the portion of the container has a second color, the portion of the container having the second color being located across the aperture peripheral boundary from the portion of the shrink sleeve having the first color, wherein the first color and the second color are substantially similar along at least about 10% of the peripheral length of the peripheral boundary.

B. A container according to paragraph A, wherein the container comprises a handle, and wherein the shrink sleeve aperture is substantially aligned with the handle.

C. A container according to any one of paragraphs A or B, wherein the handle is a pinch grip or a through handle, preferably a through handle.

D. A container according to any one of paragraphs A-C, wherein the handle comprises surface irregularities.

E. A container according to any one of paragraphs A-D, wherein the shrink sleeve comprises at least two shrink sleeve apertures.

F. A container according to paragraph E, wherein the at least two shrink sleeve apertures are on opposing sides of a handle of the container.

G. A container according to any one of paragraphs E or F, wherein the at least two shrink sleeve apertures are symmetrical.

H. A container according to any one of paragraphs A-G, wherein the first color and the second color are substantially both white, black, red, orange, yellow, green, blue, or purple, preferably white or purple.

I. A container according to any one of paragraphs A-H, wherein the first color and the second color are characterized by a ΔE value that is less than about 10, or less than about 7.5, or less than about 5, or less than about 3, or is equal to or less than about 2, or equal to or less than about 1.

J. A container according to any one of paragraphs A-I, wherein the first color and the second color are substantially similar in a continuous fashion along at least about 10% of the peripheral length of the peripheral boundary.

K. A container according to any one of paragraphs A-J, wherein the first color and the second color are substantially similar along at least about 25%, or at least about 50%, or at least about 75%, or at least about 90%, or about 100% of the peripheral length of the aperture peripheral boundary.

L. A container according to any one of paragraphs A-K, wherein the aperture has a minor dimension, wherein the portion of the sleeve having the first color has a sleeve depth dimension measured perpendicularly from the aperture, and at least one of the following is true:
 a) the sleeve depth dimension is at least 1% of the aperture's minor dimension; and/or
 b) the sleeve depth dimension is at least about 2 mm, or at least about 5 mm, or at least about 10 mm, or at least about 15 mm, or at least about 20 mm.

M. A container according to any one of paragraphs A-L, wherein the aperture has a minor dimension, wherein the portion of the container having the second color has a container depth dimension measured perpendicularly from the edge, and at least one of the following is true:
 a) the container depth dimension is at least 1% of the aperture's minor dimension; and/or
 b) the container depth dimension is at least about 2 mm, or at least about 5 mm, or at least about 10 mm, or at least about 15 mm, or at least about 20 mm.

N. A container according to any one of paragraphs A-M, wherein the container is a blow molded container.

O. A container according to any one of paragraphs A-N, wherein the container further comprises a window.

P. A container according to any one of paragraphs A-O, wherein the container contains a household care composition.

Q. A container according to any one of paragraphs A-P, wherein the container contains a liquid composition, preferably a liquid composition characterized by a viscosity of from about 1 to about 2000 centipoise (1-2000 mPa·s), more preferably from about 100 to about 1200, even more preferably from about 200 to about 800 centipoise (200-800 mPa·s), wherein the viscosity is determined using a Brookfield viscometer, No. 2 spindle, at 60 RPM/s, measured at 25° C.

R. A process for preparing a container according to any one of paragraphs A-Q the process comprising the steps of: providing a shrink sleeve to a container; conform the shrink sleeve to the container via increased temperature; cutting a predetermined removeable portion from the shrink sleeve; removing the predetermined removeable portion from the shrink sleeve, thereby forming the shrink sleeve aperture.

S. A process according to paragraph R, wherein the predetermined removeable portion is cut from the shrink sleeve with a laser.

T. A container at least partially surrounded by a shrink sleeve, the shrink sleeve comprising a shrink sleeve aperture, the shrink sleeve aperture being defined by an aperture peripheral boundary, the aperture peripheral boundary having a peripheral length, wherein a portion of the shrink sleeve adjacent to the aperture peripheral boundary has a first color; wherein a portion of the container adjacent to the aperture peripheral boundary is visible through the aperture, wherein the portion of the container has a second color, the portion of the container having the second color being located across the aperture peripheral boundary from the portion of the shrink sleeve having the first color, wherein the first color and the second color are substantially different along at least about 10% of the peripheral length of the peripheral boundary.

U. A container according to paragraph T, wherein the ΔE between the first color and the second color is greater than about 10, or greater than about 15, or greater than about 20, or greater than about 30, or greater than about 40, or greater than about 50.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A container at least partially surrounded by a shrink sleeve,
   the shrink sleeve comprising a shrink sleeve aperture,
   the shrink sleeve aperture being defined by an aperture peripheral boundary,
   the aperture peripheral boundary having a peripheral length, wherein the aperture has a major aperture dimension and a minor aperture dimension, wherein the shrink sleeve comprises at least two of the shrink sleeve apertures,
   wherein a portion of the shrink sleeve adjacent to the aperture peripheral boundary has a first color;
   wherein a portion of the container adjacent to the aperture peripheral boundary is visible through the aperture, wherein the portion of the container has a second color, the portion of the container having the second color being located across the aperture peripheral boundary from the portion of the shrink sleeve having the first color,
   wherein the first color and the second color are substantially similar along at least about 10% of the peripheral length of the peripheral boundary,
   wherein the container comprises a handle, and wherein the shrink sleeve apertures are substantially aligned with the handle, wherein the handle is a through hole, wherein the through hole has a through hole major dimension and a through hole minor dimension,
   wherein the major aperture dimension is larger than the through hole major dimension, and
   wherein the minor aperture dimension is larger than the through hole minor dimension.

2. A container according to claim 1, wherein the handle comprises surface irregularities.

3. A container according to claim 1, wherein the at least two shrink sleeve apertures are on opposing sides of a handle of the container.

4. A container according to claim 1, wherein the at least two shrink sleeve apertures are symmetrical.

5. A container according to claim 1, wherein the first color and the second color are substantially both white, black, red, orange, yellow, green, blue, or purple.

6. A container according to claim 1, wherein the first color and the second color are characterized by a ΔE value that is less than about 10, or less than about 7.5, or less than about 5, or less than about 3, or is equal to or less than about 2, or equal to or less than about 1.

7. A container according to claim 1, wherein the first color and the second color are substantially similar in a continuous fashion along at least about 10% of the peripheral length of the peripheral boundary.

8. A container according to claim 1, wherein the first color and the second color are substantially similar along at least about 25%, or at least about 50%, or at least about 75%, or at least about 90%, or about 100% of the peripheral length of the aperture peripheral boundary.

9. A container according to claim 1, wherein the aperture has a minor dimension, wherein the portion of the sleeve having the first color has a sleeve depth dimension measured perpendicularly from the aperture, and at least one of the following is true:
   a) the sleeve depth dimension is at least 1% of the aperture's minor dimension; and/or
   b) the sleeve depth dimension is at least about 2 mm, or at least about 5 mm, or at least about 10 mm, or at least about 15 mm, or at least about 20 mm.

10. A container according to claim 1, wherein the aperture has a minor dimension, wherein the portion of the container having the second color has a container depth dimension measured perpendicularly from the edge, and at least one of the following is true:
   a) the container depth dimension is at least 1% of the aperture's minor dimension; and/or b) the container depth dimension is at least about 2 mm, or at least about 5 mm, or at least about 10 mm, or at least about 15 mm, or at least about 20 mm.

11. A container according to claim 1, wherein the container is a blow molded container.

12. A container according to claim 1, wherein the container further comprises a window.

13. A container according to claim 1, wherein the container contains a household care composition.

14. A container according to claim 1, wherein the container contains a liquid composition.

15. A process for preparing a container according to claim 1, the process comprising the steps of:
provide a shrink sleeve to a container;
conform the shrink sleeve to the container via increased temperature;
cutting a predetermined removeable portion from the shrink sleeve;
removing the predetermined removeable portion from the shrink sleeve, thereby forming the shrink sleeve aperture.

16. A process according to claim 15, wherein the predetermined removeable portion is cut from the shrink sleeve with a laser.

17. A container at least partially surrounded by a shrink sleeve,
the shrink sleeve comprising a shrink sleeve aperture,
the shrink sleeve aperture being defined by an aperture peripheral boundary,
the aperture peripheral boundary having a peripheral length, wherein the aperture has a major aperture dimension and a minor aperture dimension, wherein the shrink sleeve comprises at least two of the shrink sleeve apertures,
wherein a portion of the shrink sleeve adjacent to the aperture peripheral boundary has a first color;
wherein a portion of the container adjacent to the aperture peripheral boundary is visible through the aperture,
wherein the portion of the container has a second color,
the portion of the container having the second color being located across the aperture peripheral boundary from the portion of the shrink sleeve having the first color,
wherein the first color and the second color are substantially different along at least about 10% of the peripheral length of the peripheral boundary,
wherein the container comprises a handle, and wherein the shrink sleeve apertures are substantially aligned with the handle, wherein the handle is a through hole, wherein the through hole has a through hole major dimension and a through hole minor dimension,
wherein the major aperture dimension is larger than the through hole major dimension, and
wherein the minor aperture dimension is larger than the through hole minor dimension.

18. A container according to claim 17, wherein the ΔE between the first color and the second color is greater than about 10, or greater than about 15, or greater than about 20, or greater than about 30, or greater than about 40, or greater than about 50.

* * * * *